United States Patent [19]

Richmond et al.

[11] 4,078,844

[45] Mar. 14, 1978

[54] TRUCK AND TRAILER BRAKING SYSTEMS

[75] Inventors: Eric William Richmond; Wilbur Mills Page, both of Lincoln, England

[73] Assignee: Clayton Dewandre Company Limited, Lincoln, England

[21] Appl. No.: 745,846

[22] Filed: Nov. 29, 1976

[51] Int. Cl.² .............................................. B60T 8/22
[52] U.S. Cl. ..................................... 303/22 R; 303/40
[58] Field of Search ................. 188/195; 303/7, 22 A, 303/22 R, 40

[56] References Cited

U.S. PATENT DOCUMENTS

| | | | |
|---|---|---|---|
| 3,403,944 | 10/1968 | Thirion | 303/22 R X |
| 3,944,294 | 3/1976 | Masuda et al. | 303/22 R |

Primary Examiner—Duane A. Reger
Attorney, Agent, or Firm—Norris & Bateman

[57] ABSTRACT

An air brake system for truck and trailer combinations comprises a vehicle load sensing valve in the rear wheel brake line of the truck, a truck-mounted relay valve incorporating a piston or piston assembly responsive to truck braking pressures and adapted to actuate valve means to control delivery of pressure to the trailer service brake line, and an additional piston, piston assembly or piston/diaphragm assembly in the relay valve which also actuates the valve means and which is responsive on opposite sides to the input and output pressures respectively of the vehicle load sensing valve.

12 Claims, 4 Drawing Figures

TRUCK AND TRAILER BRAKING SYSTEMS

This invention relates to air brake systems for truck and trailer combinations and is particularly concerned with systems of the kind in which a load sensing valve is incorporated in the rear brake line of the truck and in which a relay valve embodying a valve element actuated by a piston or piston assembly responsive to truck braking pressures produces a delivery pressure to the trailer service line.

To ensure that trucks and drawbar trailers meet certain standards of compatibility with respect to their brake line pressure/deceleration characteristics, although their respective states of loading may be different, it is necessary for the pressure delivered from the truck to the trailer via the "Service" coupling to bear a predetermined relationship to the deceleration of the truck.

For example, when the truck is lightly laden the brake line air pressure required to decelerate it is less than when the truck is fully laden, but nevertheless a sufficient pressure must be transmitted to the trailer brakes to enable the trailer to be braked effectively when it is fully laden. The object of the present invention is to provide means which will achieve this effect.

According to the invention in a truck and trailer braking system of the kind referred to the relay valve is provided with an additional piston, piston assembly or piston/diaphragm assembly also actuating the valve element controlling the delivery of pressure to the trailer service line, said additional piston or assembly being responsive on opposite sides to the input and output pressures respectively of the load sensing valve in the truck rear brake line.

Reference will now be made to the accompanying drawings wherein.

Figure 1:
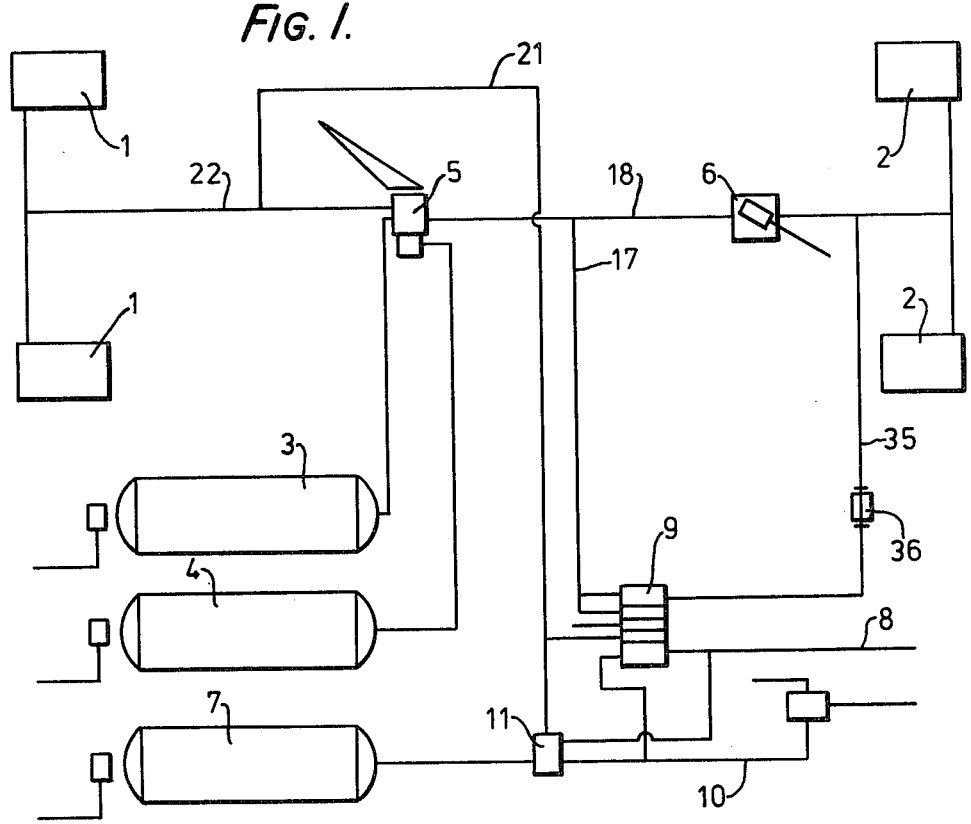
FIG. 1 shows diagrammatically a truck and trailer air braking system in accordance with the present invention.
Figure 2:
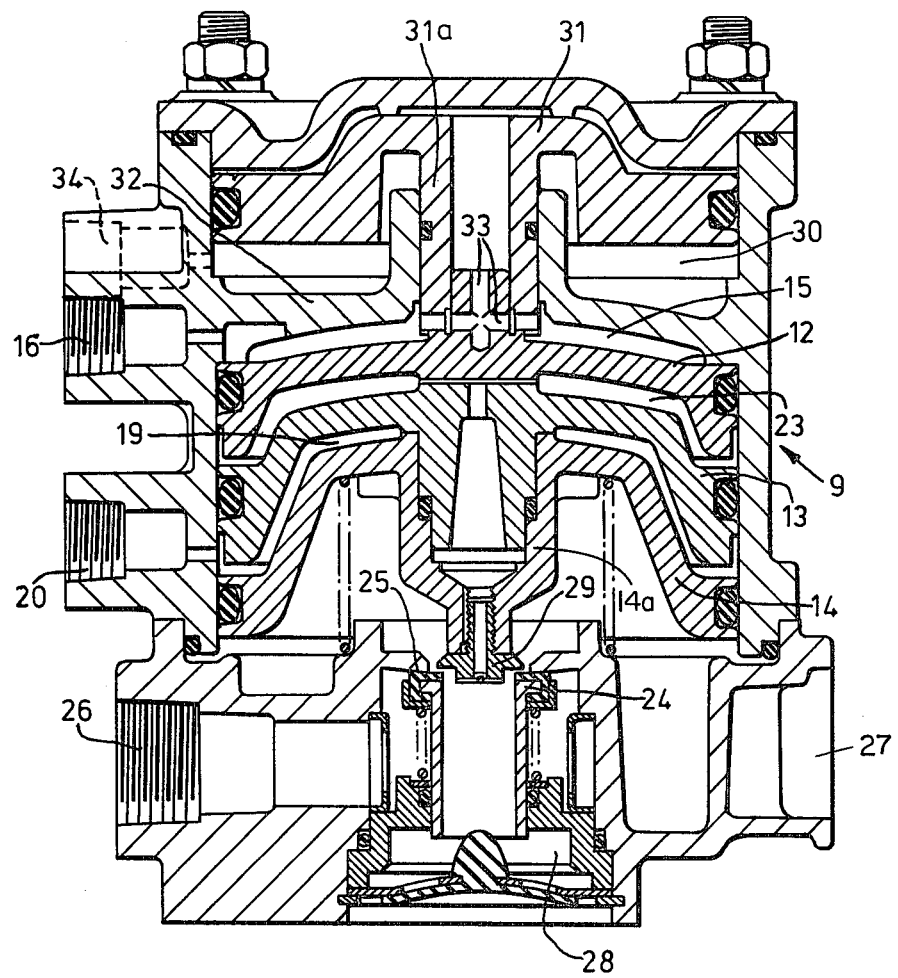
FIG. 2 is an axial sectional view of the modified triple relay valve used therein.

Referring first to FIGS. 1 and 2, there is shown a conventional dual circuit system in which front and rear wheel brakes 1, 2 are pressurised respectively from reservoirs 3, 4 under control of a dual brake valve 5, the rear wheel brake circuit also including a load sensing valve 6. A further truck-mounted reservoir 7 supplies a trailer service brake line 8 via a relay valve 9, the system also comprising a trailer emergency brake line 10 charged from the reservoir 7 through a line including a dump valve 11.

The lower portion of the valve 9 consists of a standard triple relay valve assembly comprising three superimposed pistons 12, 13, 14, the space 15 above piston 12 being connected via a port 16 and line 17 to the rear brake service line 18 at the input side of load sensing valve 6, while the space 19 above piston 14 is connected via port 20 and line 21 to the front brake service line 22. The space 23 above piston 13 is either connected to a secondary braking system, when provided, or is vented to atmosphere. Located beneath the piston assembly is a hollow spring-loaded tappet valve 24 which co-acts with a fixed annular seating 25 to control communication between an inlet port 26, connected by line 10 to the reservoir 7, and an outlet port 27 to which the trailer service brake line 8 is connected. The hollow tappet valve 24 opens at its lower end into a chamber 28 vented to atmosphere while the lower piston 14 is formed on its underside with an extension 14a carrying a valve-actuating member 29 which, when piston 14 is depressed, engages and moves the tappet valve 24 from its seating 25 so disconnecting the trailer brake service line from exhaust and connecting it to the trailer reservoir, the three pistons operating in a known non-compounding manner to produce a delivery pressure to the trailer service line which is equal to the footbrake delivery pressure, or the secondary brake delivery pressure where provided.

For the purpose of the invention the relay valve housing is extended at its upper end to provide a further chamber 30 in which an additional piston 31 is located, a hollow stem 31a on this piston extending through a wall 32 of the housing and into abutment with the uppermost piston 12 of the triple piston assembly. The space above said additional piston is connected via the bore of piston stem 31a and passageways 33 in the piston structure to the space 15 and so to the truck rear brake line 18 upstream of the load sensing valve 6 so that the upper surface of this piston is subjected to load sensing valve input pressure, while the space below the piston 31 is connected via a further port 34 and a line 35 to said brake line downstream of the load sensing valve whereby the under surface of this piston is subjected to load sensing valve output pressure.

The valve operates as follows:

When the truck is fully laden, the load sensing valve 6 operates at a 1:1 ratio, that is, its input and output pressures are equal. Thus pressures across the piston 31 balance out and this piston has no effect on the normal triple relay valve operation. Should, however, the truck be less than fully laden, the load sensing valve will deliver an output pressure less than the input pressure and the excess pressure above the piston 31 will cause this piston to exert a downward thrust onto the triple piston assembly to augment the thrust of that assembly onto the valve element 24. In this manner a pressure is transmitted to the trailer service line which is higher than the pressure delivered by the truck brake valve to the truck brakes and to the triple relay valve, so compensating for the lowered truck brake pressure in the unladen condition.

By suitable proportioning of the unit any desired relationship between truck load sensing valve ratio, truck brake valve delivery pressure and trailer service line pressure can be provided.

Figure 3:
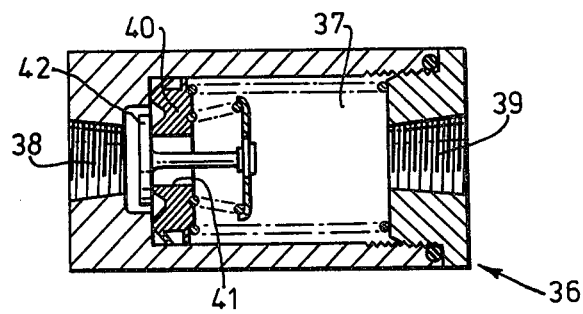
FIG. 3 is an axial sectional view of an optional biassing valve used in the system.

If desired, a constant pressure bias to the trailer may be provided which is effective regardless of the truck load sensing valve setting. This is achieved by inserting in the line 35 connecting the space beneath piston 31 of the relay valve to the modulated pressure side of the load sensing valve 6 a biassed check valve 36, for example, of the construction shown in FIG. 3. This valve comprises basically a housing defining a valve chamber 37 having an inlet port 38 and an outlet port 39, and a spring-loaded disc valve 40 which opens to permit flow of pressure fluid from the inlet to the outlet. Flow in the opposite direction is permitted through a bore 41 in the disc valve, the flow being controlled by a spring-loaded tappet valve 42 and the arrangement providing a constant pressure bias to the trailer of for example 0.5 bar. Dynamically, the valve 36 applies pressure to the trailer service line 8 more in advance of the truck brakes than is normally achieved by the standard or conventional relay valve.

Figure 4:
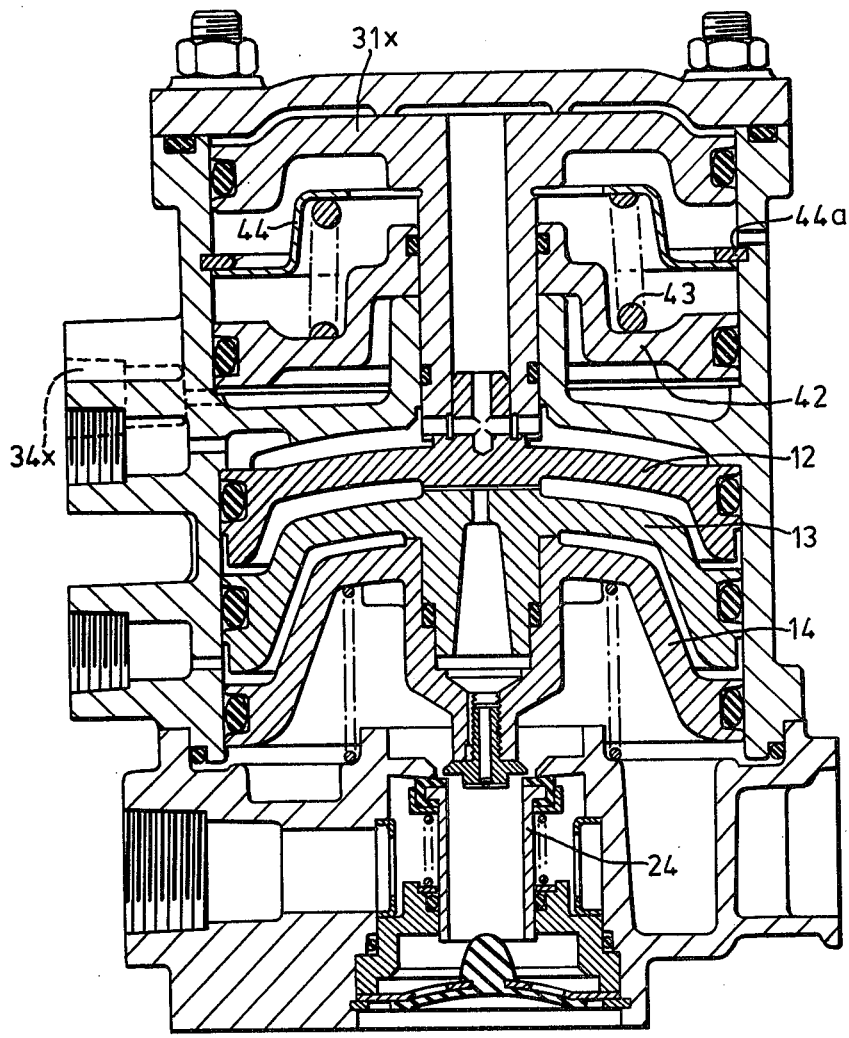
FIG. 4 is a view similar to FIG. 2 but of a modified form of the relay valve.

FIG. 4 illustrates a modified form of the relay valve which incorporates alternative means for providing a fixed pressure bias to the trailer service line. In this construction the triple relay piston and valve assembly is as in FIG. 2 but the piston 31 of that valve is substituted by an upper piston 31x, a lower control piston 42 and a bias spring 43 interposed between the control piston 42 and an abutment ring 44 held against a fixed circlip 44a. The space above piston 31x is connected as before to the truck rear brake line 18 on the input side of the load sensing valve 6, the space below the control piston 42 is connected via a port 34x to said brake line at the output side of the load sensing valve while the space between pistons 31x and 42 is vented to atmosphere. Thus on initiation of a brake actuation the control piston 42 has to overcome the fitted load of the bias spring 43 before it can abut the piston 31x and oppose its downward thrust on the triple piston assembly 12, 13, 14 and so on the valve member 24. In this manner a fixed pressure bias to the trailer brake system is established at all load sensing ratios. The piston assembly 31x, 42 may if desired be substituted by a piston/diaphragm assembly.

An important feature of the present invention is that the additional piston 31 (31x) in the relay valve is not attached to the triple relay piston assembly and can therefore never cause the pressure delivered to the trailer to be less than the pressure delivered by the truck brake valve.

The invention is not restricted to systems incorporating triple relay valves and can equally well be applied to single or dual relay valve systems.

We claim:

1. In a truck and trailer braking system, a braking assembly for said truck, means for selectively applying operating fluid pressure from a source to actuate said truck braking assembly, said truck braking assembly including a service brake line containing a load sensing valve having an input side connected to receive said operating fluid pressure and an output side producing said operating fluid pressure modulated in proportion to truck loading, trailer brake actuating means comprising valve means for selectively connecting a trailer brake service line to a source of fluid pressure, fluid pressure responsive means connected to be operated by said menas for applying operating fluid pressure to actuate said truck brakes for actuating said valve to connect said trailer brake service line to its source when the truck brakes are operated, and means responsive to a differential in fluid pressure across said load sensing valve when the truck brakes are applied for modifying the action of said fluid pressure responsive means in operating the trailer brakes.

2. In the truck and trailer braking system defined in claim 1, said track service line being the line to the rear wheels of said truck.

3. In the truck and trailer braking system defined in claim 1, said last named means augumenting said fluid pressure responsive means in inverse proportion to the difference in pressure between the input and output sides of said load sensing valve.

4. In the truck and trailer braking system defined in claim 1, means in said last named means for providing a substantially fixed constant pressure bias for trailer brake operation.

5. In the truck and trailer braking assembly defined in claim 1, said fluid pressure responsive means comprising at least one fluid movable pressure responsive element connected to actuate said valve, and said means for modifying the action of said fluid pressure responsive means comprises further fluid pressure responsive means in tandem with said element and means for applying said load sensing valve input and output pressures to opposite sides of said further pressure responsive means.

6. In the truck and trailer braking system defined in claim 5, said further fluid pressure responsive means comprising a piston or diaphragm unit connected at one side to said element, and means is provided connecting the output pressure of said load sensing valve to said one side and the inlet pressure of said load sensing valve to the other side of said piston on diaphgrgm unit.

7. In the truck and trailer braking system defined in claim 6, said unit comprising a single piston.

8. In the truck and trailer braking system defined in claim 6, said unit comprising two spaced pistons having adjacent sides connected by a compression spring, with the load sensing valve output pressure applied to the piston side remote from the piston side connected to said element, whereby the force of said spring must be overcome before said unit acts to modify the action of said fluid pressure responsive means.

9. In the truck and trailer braking assembly defined in claim 1, said fluid pressure responsive means comprising a column of pistons in tandem with the piston at one end of the column carrying a member for operating said valve and the piston at the other end of the column having the operating fluid pressure applied to its outer surface during brake actuation, and said last named means comprising piston means having one side in abutment with said piston at the other end of the column and having said load sensing valve output pressure applied to said one side, with said operating fluid pressure being applied to the opposite side of said piston means.

10. In the truck and trailer braking system defined in claim 9, means whereby said operating fluid pressure is introduced into a space at the surface of said piston at the other end of the column and then transmitted to said opposite side of said piston means through passage means that extends through said piston means.

11. In the truck and trailer braking system defined in claim 1, said truck service brake line being a rear wheel brake line, and said means responsive to differential pressure across the load sensing valve being piston or diaphragm means having one side connected by a first passage to said service brake line at the input side of said load sensing valve and its other side connected by a second passage to said service line at the output side of said load sensing valve.

12. In the truck and trailer braking system defined in claim 11, a check valve in said second passage providing a fixed constant pressure bias for trailer brake operation.

* * * * *